R. W. DOUGLASS.
REGULATOR FOR COMPRESSORS.
APPLICATION FILED JULY 19, 1912.
1,191,774.
Patented July 18, 1916.
2 SHEETS—SHEET 1.
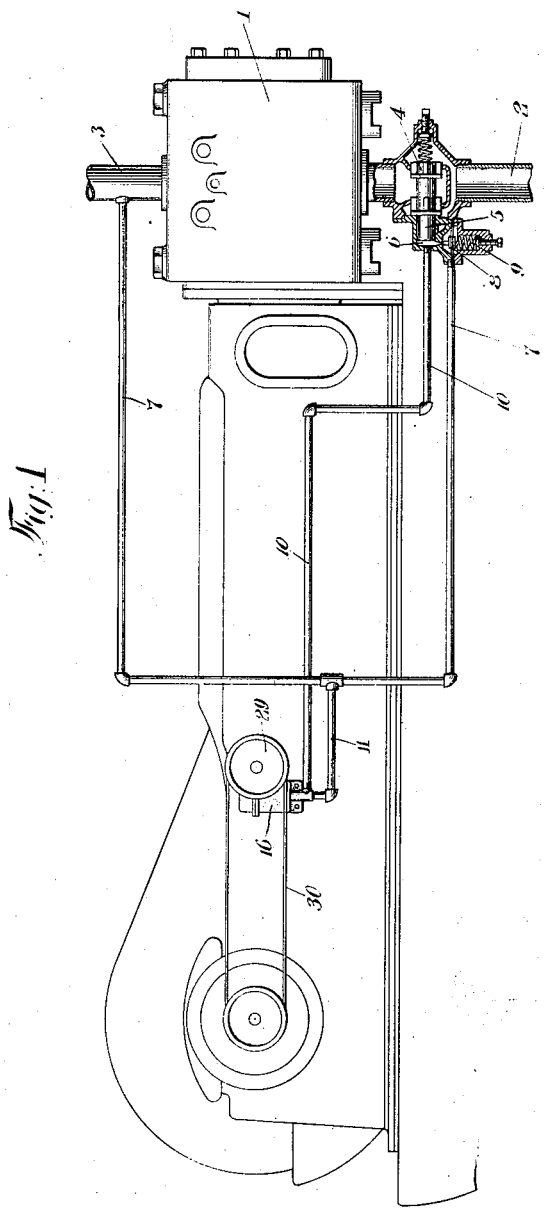
Witnesses:
Fred V. Overton
Alice C. Brorstrom
Inventor
Richard W. Douglass
By Attorney
Philip Burwell Goode R. W. DOUGLASS.
REGULATOR FOR COMPRESSORS.
APPLICATION FILED JULY 19, 1912.
1,191,774.
Patented July 18, 1916.
2 SHEETS—SHEET 2.
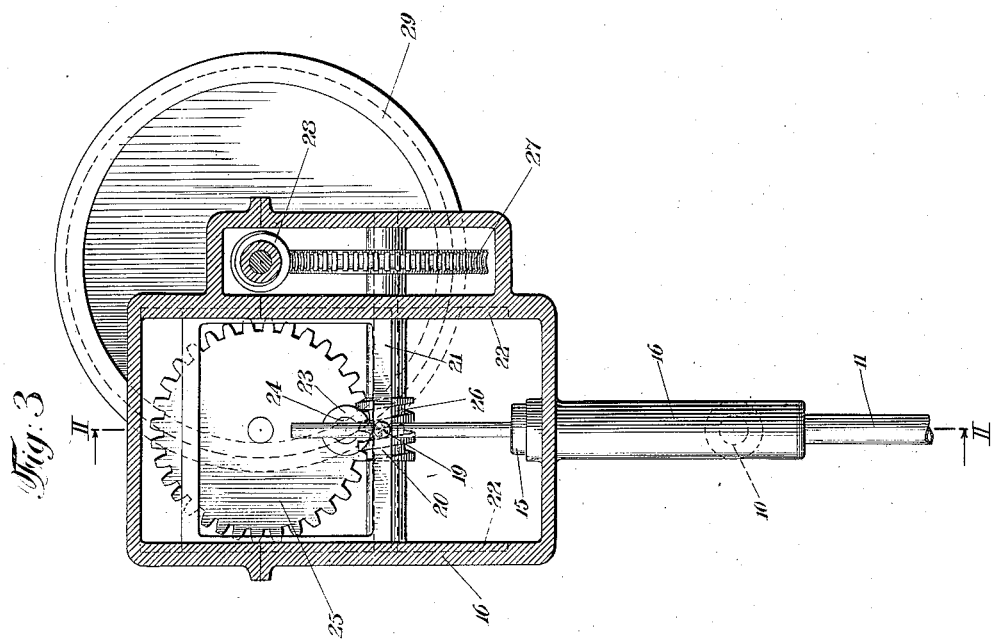
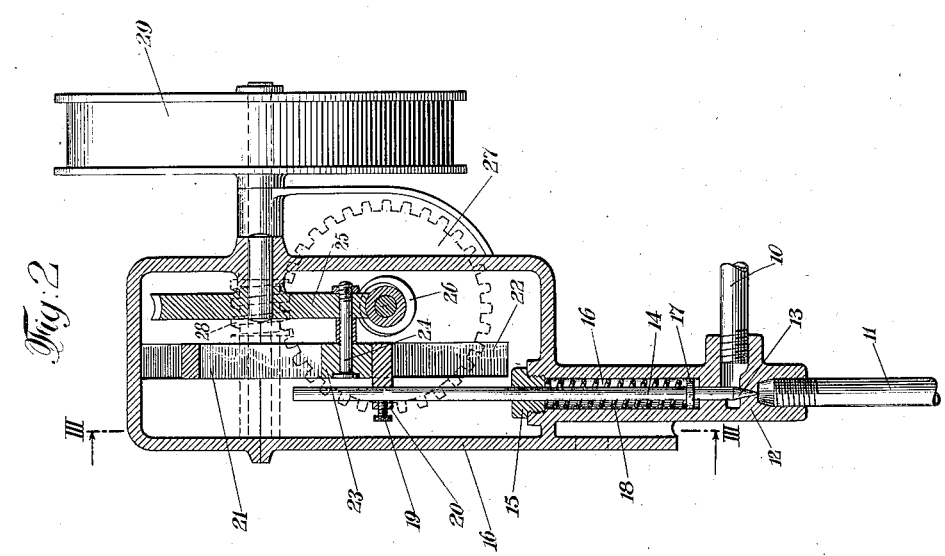
Witnesses:
Inventor
Richard W. Douglass
By Attorney

UNITED STATES PATENT OFFICE.

RICHARD W. DOUGLASS, OF WHITE PLAINS, NEW YORK, ASSIGNOR TO INGERSOLL-RAND COMPANY, OF NEW YORK, N. Y., A CORPORATION OF NEW JERSEY.

REGULATOR FOR COMPRESSORS.

1,191,774.  Specification of Letters Patent.  Patented July 18, 1916.

Application filed July 19, 1912. Serial No. 710,371.

*To all whom it may concern:*

Be it known that I, RICHARD W. DOUGLASS, a citizen of the United States, residing at White Plains, in the county of Westchester and State of New York, have invented certain new and useful Improvements in Regulators for Compressors, of which the following is a specification.

This invention relates to regulators for compressors and more particularly to regulators for continuously operated motor driven compressors whereby the load on the compressor and hence the amount of power used is regulated by controlling the discharge of the compressor into the receiving means. Regulators of this type are of various kinds, some reduce the load on the compressor by throwing in additional clearance at the ends of the cylinder, others by varying the amount of air or other gas taken into the compressor, others by closing off the intake of the compressor entirely, others by opening the discharge line of the compressor to the atmosphere rather than to the receiving means; and still others by combination of two of these forms of unloaders. As ordinarily constructed these regulators or unloaders are arranged to operate when the pressure in the receiving means reaches a certain predetermined amount. It often happens however that, although a certain pressure is required, the full capacity of the compressor is not required for extended periods of time and it is advisable under such conditions to operate the compressor partially unloaded. Under such conditions the actual amount of power used will therefore be low. Where electricity is bought from a power company, however, in a majority of cases the charge for power is made up of a combination of two charges, one based on the actual consumption of electricity and the other based on the maximum amount used for a certain specified period, generally from three to five minutes. With these ordinary forms of unloaders although the average demand may be considerably less than the capacity of the compressor and hence will permit the compressor to be unloaded for part of the time, still there are apt to be temporary fluctuations in the demand which will cause the compressor to operate at its full capacity for this specified period of time, or longer, thus incurring the maximum rate of the second charge referred to above.

The object of the present invention is to provide a means whereby when it is desired to operate a compressor at a certain degree of underload on the average, the unloading means can be regulated so that the compressor can never operate at its full capacity for a period long enough to incur the maximum rate of this second charge. Where the unloading is accomplished by a clearance controller, a valve which closes the intake to a varying degree, or any other unloading means which variably unloads the compressor, the desired result can be accomplished by limiting the action of the unloader so that it never permits the capacity of the compressor to go beyond a certain predetermined maximum. Where however the unloader is of the type which completely unloads the compressor such as, for instance, a discharge line unloader or an unloader completely closing off the intake of the compressor, or a combination of these, a different means of regulation must be resorted to and it is toward these types of unloaders that the present invention is principally directed although it is equally as well adapted for use with a variable unloader if desired and such use is intended, to be covered by the claims.

With the object above mentioned in view I have devised a regulating means, a practical embodiment of which is shown in the accompanying drawings in connection with an unloader of the intake closing type.

In the drawings: Figure 1 is a side elevation of a compressor showing my invention applied thereto, Fig. 2 is a section through the regulating means taken in the line II—II of Fig. 3 and Fig. 3 is a section at right angles of Fig. 2 on the line III—III.

The compressor as shown comprises a cylinder 1 provided with an inlet pipe 2 and a discharge pipe 3. In the inlet pipe 2 is situated an intake closing unloader of usual construction comprising a valve 4 operated by a piston 5 which slides in the cylinder 6. The valve 4 is closed by air from the discharge line of the compressor which is conveyed to the cylinder 6 by a pipe 7, its admission to the cylinder 5 to unload the compressor being governed by a diaphragm controlled needle valve 8 which opens at a discharge line pressure determined by the adjustment of the spring 9. By means of this mechanism, which is of well known construction the compressor is unloaded at a predetermined pressure in the discharge line which prevents the pressure in the receiver from becoming too great.

In the present invention however there is an additional means for unloading the compressor. Opening directly into the cylinder 6 is a pipe 10 which is periodically connected with the discharge line pipe 7 through a pipe 11 by the following mechanism. Pipes 10 and 11 both open into a valve chest 12, the opening between them being controlled by a needle valve 13 which forms the lower end of a long valve rod 14. Valve rod 14 extends upwardly through a plug 15 into a casing 16, and is provided near its lower end with a flange 17 against which presses a spring 18 the upper end of which contacts against the plug 15, this spring 18 serving to hold the valve in closed position. The valve rod 14 passes through and is adjustably secured by means of a screw 19 in a forwardly projecting portion 20 of a rectangular yoke 21 which slides freely up and down in grooves 22 in the sides of the casing 16. A periodical upward motion is given to this yoke 21 by means of a roller 23 secured by a pin 24 near the outer edge of a gear wheel 25. The roller 23 contacts with the upper cross bar during part of its revolution thus raising the yoke and the valve rod 14 and opening the valve 13. The gear wheel 25 is actuated by a worm 26 which is in turn actuated by further reduction gearing comprising a gear wheel 27 and worm 28. The worm 28 is actuated through a pulley 29 which is driven by a belt 30 from the main shaft of the compressor.

In operation, supposing it were desired to operate the compressor at half load, and the second power charge described above were calculated on the maximum amount of electricity taken for any five minutes period, the reduction gearing comprising the gears 25 and 27 and the worms 26 and 28 would be so chosen that the gear 25 would make a complete revolution in some period less than five minutes, say for instance one minute. The yoke 21 would then be adjusted so that the roller 23 would contact with the upper cross-bar and lift it from its normal position during half the revolution of the gear 25, thereby lifting the valve 13 from its seat and establishing communication between pipes 10 and 11 for half the time. In this way the compressor would operate at full load during the time the valve 13 was closed and would be completely unloaded during the period that the valve 13 was open, connecting pipes 10 and 11 and allowing receiver pressure to enter the cylinder, thus closing off the valve 4 which controls the intake to the compressor. The compressor would therefore be alternately unloaded and fully loaded for intervals of a half minute and would accordingly never operate at maximum capacity for any period as long as five minutes. Instead of half minute alternations the compressor might be of course run at full load for say four minutes and unloaded for a like time but in order to keep the receiver of reasonable size more frequent alternations are advisable as to prevent fluctuations in pressure in the receiver when the compressor is not furnishing air to it for such long periods, a receiver of large volume would be necessary. This periodical unloading in no way interferes with the normal unloading of the compressor which is occasioned by the receiver pressure exceeding a predetermined amount. It is also evident that by varying the position of the yoke 21 the valve 13 can be kept open and the compressor run unloaded for any desired portion of the time, while by changing the reduction gearing the period of alternation can be changed.

It is to be understood that the present showing and description discloses only one specified modification of my invention and other forms and modifications are included in the spirit and scope of the invention as expressed in the claims.

What I claim is:

1. In combination, a compressor, unloading means therefor, and means for operating said unloader at definite intervals irrespective of the compressing operation.

2. In combination, a compressor, driving means therefor, an unloader for said compressor, and means actuated by said driving means for operating said unloader at definite intervals irrespective of the compressing operation.

3. In combination, a compressor, unloading means therefor, means for operating said unloader at definite intervals irrespective of the compressing operation and means for varying the duration of the operation of said unloading means.

4. In combination, a compressor, driving means therefor, an unloader for said compressor, means actuated by said driving means for operating said unloader for definite periods at indefinite intervals irrespective of the compressing operation and means for varying the duration of said periods of operation.

5. In combination, a compressor, means for unloading said compressor comprising a fluid operated valve, and means for periodically admitting fluid to said unloading means to operate said valve.

6. In combination, a compressor, a driving shaft therefor, a fluid operated unloading means for said compressor, a valve for admitting fluid to said unloading means and means operated from said driving shaft to periodically operate said valve.

7. In combination, a compressor, a driving shaft therefor, a fluid operated unloading means for said compressor, a valve for admitting fluid to said unloading means, a speed reduction gearing connected with said driving shaft, and means actuated by said gearing to alternately open and close said valve.

8. In combination, a compressor, a fluid operated unloading means therefor, a valve for admitting fluid to said unloading means, means to maintain said valve in open position for predetermined periods and means to vary the duration of said open periods.

9. In combination, a compressor, its driving shaft, fluid operated unloading means for said compressor, a valve for admitting fluid to said unloading means, a reduction gearing connected with said driving shaft comprising a gear wheel, valve, and means on said gear wheel to periodically engage and operate said valve for predetermined periods to actuate said unloading means.

10. In combination, a compressor, a receiving means, means for unloading a compressor at a predetermined fluid pressure in said receiving means, and means independent of said fluid pressure for periodically unloading said compressor.

11. In combination, a compressor, a receiving means therefor, means for unloading said compressor, means controlled by the fluid pressure in said receiver for operating said unloading means, and separate means for periodically operating said unloading means.

RICHARD W. DOUGLASS.

Witnesses:
A. M. HAYES,
RALPH BURWELL GOODE.